(12) United States Patent
Choi et al.

(10) Patent No.: US 10,483,537 B2
(45) Date of Patent: Nov. 19, 2019

(54) POSITIVE ACTIVE MATERIAL AND METHOD FOR PRODUCING THE SAME

(71) Applicant: ECOPRO BM CO., LTD., Cheongju-si, Chungcheongbuk-do (KR)

(72) Inventors: Moon Ho Choi, Cheongju-si (KR); Jik Soo Kim, Cheongju-si (KR); Jin Kyeong Yun, Cheongju-si (KR); Suk Yong Jeon, Chungju-si (KR); Jae Yong Jung, Cheongju-si (KR); Suk Whan Lee, Chungcheongbuk-do (KR)

(73) Assignee: ECOPRO BM CO., LTD., Cheongju-si, Chungcheongbuk-Do (KR)

( * ) Notice: Subject to any disclaimer, the term of this patent is extended or adjusted under 35 U.S.C. 154(b) by 38 days.

(21) Appl. No.: 15/634,330

(22) Filed: Jun. 27, 2017

(65) Prior Publication Data
US 2017/0294651 A1    Oct. 12, 2017

Related U.S. Application Data

(63) Continuation-in-part of application No. PCT/KR2015/007719, filed on Jul. 24, 2015.

(30) Foreign Application Priority Data

Dec. 31, 2014    (KR) .................. 10-2014-0195504

(51) Int. Cl.
| | |
|---|---|
| *H01M 4/13* | (2010.01) |
| *H01M 4/485* | (2010.01) |
| *H01M 4/36* | (2006.01) |
| *H01M 4/525* | (2010.01) |
| *H01M 4/62* | (2006.01) |

(Continued)

(52) U.S. Cl.
CPC ............ *H01M 4/485* (2013.01); *C01F 7/043* (2013.01); *C01G 53/00* (2013.01); *C01G 53/42* (2013.01); *H01M 4/0471* (2013.01); *H01M 4/36* (2013.01); *H01M 4/364* (2013.01); *H01M 4/366* (2013.01); *H01M 4/525* (2013.01); *H01M 4/62* (2013.01);
(Continued)

(58) Field of Classification Search
CPC ...... H01M 4/485; H01M 4/0471; H01M 4/36; H01M 4/364; H01M 4/366; H01M 4/525; H01M 4/62; H01M 4/505
See application file for complete search history.

(56) References Cited

U.S. PATENT DOCUMENTS

2015/0104708 A1*   4/2015   Bi ................. H01M 4/525
                                              429/220

FOREIGN PATENT DOCUMENTS

| CN | 102832389 A | 12/2012 |
| CN | 104241636 A | 12/2014 |

(Continued)

OTHER PUBLICATIONS

International Search Report dated Oct. 27, 2015 for PCT/KR2015/007719 and English translation.

(Continued)

*Primary Examiner* — Jane J Rhee
(74) *Attorney, Agent, or Firm* — Lucas & Mercanti, LLP

(57) ABSTRACT

The present invention relates to a positive active material and a method for producing same and, more specifically, to a positive active material comprising LiAlO2 at the surface thereof as a result of reacting an Al compound with residual lithium and to a method for producing same.

4 Claims, 5 Drawing Sheets
(5 of 5 Drawing Sheet(s) Filed in Color)

(51) Int. Cl.
- *H01M 4/04* (2006.01)
- *C01G 53/00* (2006.01)
- *C01F 7/04* (2006.01)
- *H01M 4/505* (2010.01)

(52) U.S. Cl.
CPC ...... *C01P 2002/72* (2013.01); *C01P 2004/84* (2013.01); *H01M 4/505* (2013.01)

(56) References Cited

FOREIGN PATENT DOCUMENTS

| | | |
|---|---|---|
| JP | 2010129471 A | 6/2010 |
| KR | 20090013661 A | 2/2009 |
| KR | 20110139172 A | 12/2011 |
| KR | 20120003380 A | 1/2012 |
| KR | 20130091174 A | 8/2013 |
| KR | 20140140686 A | 12/2014 |

OTHER PUBLICATIONS

The extended European search report, Application No. 15875470.5, dated Jun. 21, 2018.

\* cited by examiner

POSITIVE ACTIVE MATERIAL AND METHOD FOR PRODUCING THE SAME

CROSS-REFERENCE TO RELATED APPLICATIONS

This application is a continuation-in-part of PCT/KR2015/007719, filed Jul. 24, 2015, which claims the benefit of Korean Patent Application No. 10-2014-0195504, filed Dec. 31, 2014, the contents of each of which are incorporated herein by reference.

FIELD OF THE INVENTION

Embodiments of the inventive concept relate to a positive active material and a method for producing the same, and more particularly, relate to a positive active material including $LiAlO_2$ which is generated from a reaction with an Al compound and a residual lithium on the surface, and a method for producing the same.

BACKGROUND OF THE INVENTION

A general method for producing a lithium oxide composite includes sequential operations of preparing a transition metal precursor, mixing the transition metal precursor with a lithium compound, and then firing the mixture.

In this course, LiOH and/or $Li_2O_3$ are used as the lithium compound. Usually, in the case that a positive active material has Ni content equal to or smaller than 65% of the positive active material, $Li_2O_3$ is employed therein. In the case that Ni content is equal to or smaller than 65% of the positive active material, it is preferred to employ LiOH for a low temperature reaction. However, a Ni-rich system, in which Ni content is equal to or larger than 65% of the positive active material, has a problem with a high amount of residual lithium which remains in forms of LiOH and $Li_2CO_3$ on the surface of the positive active material due to a low temperature reaction. Such residual lithium, that is, non-reacted LiOH and $Li_2CO_3$, reacts with an electrolyte to cause gas generation and a swelling effect, incurring severe degradation of high temperature stability. Furthermore, the non-reacted LiOH may cause gelation due to its high viscosity while mixing slurry before manufacturing electrode plates.

Although a washing process is generally executed to remove the non-reacted Li component, this could still cause surface damage of a positive active material during a washing process, hence degrading the characteristics of capacity and rates and further inducing an additional problem such as an increase of resistance in high temperature storage.

SUMMARY OF THE INVENTION

Embodiments of the inventive concept provide a new positive active material capable of improving the characteristics of lifetime, high temperature storage, and particle strength, while removing a non-reacted Li component, and a method for producing the positive active material.

According to an aspect of the inventive concept, a positive active material includes $LiAlO_2$ in a surface.

The positive active material may include $LiAlO_2$ exhibiting a peak, where 2θ is ranged from 45° to 46°, in XRD.

The positive active material may be given in Formula 1 that is $L_{1+a}Ni_bM1_cM2_dO_2$ where 0.95≥b≥0.75, a+b+c=1, M1 is one or more selected from a group of Co, B, Ba, Cr, F, Li, Mo, P, Sr, Ti, and Zr, and M2 is one or more selected from a group of Mn, Al, B, Ba, Cr, F, Li, Mo, P, Sr, Ti, and Zr.

Residual lithium of the positive active material may be equal to or smaller than 0.6 wt %.

Particle strength of the positive active material is equal to or larger than 150 MPa.

According to another aspect of the inventive concept, a method for producing a positive active material includes preparing the positive active material, and mixedly thermally treating the positive active material with a compound including Al.

In the method for producing a positive active material, the compound including the Al may be selected from a group of $Al(OH)_3$, $Al_2O_3$, $Al(NO_3)_3$, $Al_2(SO_4)_3$, $AlCl_3$, $AlH_3$, $AlF_3$, and $AlPO_4$.

The method for producing a positive active material further includes, between the preparing of the positive active material and the mixedly agitating of the positive active material, preparing a washing solution in uniform temperature, agitating the positive active material in the washing solution, and drying the washed positive active material.

In the method for producing a positive active material, the washing solution may be distilled water or an alkaline solution.

In the method for producing a positive active material, the drying may include vacuum-drying the washed positive active material at 80 to 200° C. for 5 to 20 hours.

Other aspects, advantages, and salient features of the disclosure will become apparent to those skilled in the art from the following detailed description, which, taken in conjunction with the annexed drawings, discloses various embodiments of the present disclosure.

A positive active material has an effect of increasing particle strength as well as reducing an amount of residual lithium component due to presence of $LiAlO_2$ by doping aluminum in the positive active material and then by reacting the doped aluminum with the residual lithium which remains on the surface thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
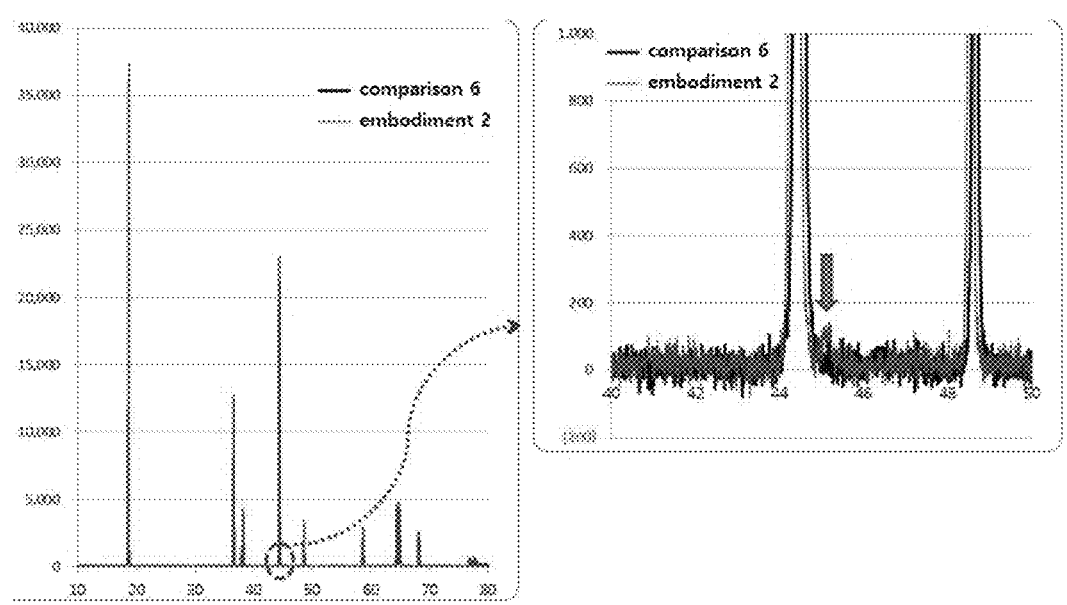
FIG. 1 shows results of measuring active materials, which are manufactured through a comparison and an embodiment according to the inventive concept, by using XRD measurement.

Hereinafter, embodiments of the inventive concept will be described in conjunction with the accompanying drawings, but the inventive concept may not be restrictive to the following embodiments.

<Embodiment> Coating Concentration Gradient Positive Active Material

After inputting distilled water of 20 L and ammonia of 840 g as a chelating agent into a batch reactor (having capacity of 70 L and a rotation motor's power equal to or larger than 80 W), agitation was performed with a motor rate of 400 rpm while maintaining internal temperature of the reactor at 50° C.

As a second operation, a first precursor solution having concentration of 2.5 M, which was mixed with nickel sulfate, cobalt sulfate, and manganese sulfate in a mole ratio of 9:1:0, was input in a rate of 2.2 L/hour and continuously an ammonia solution having concentration of 28% was input in a rate of 0.15 L/hour. Additionally, for adjusting pH, a sodium hydroxide solution having concentration of 25% was supplied to maintain pH on 11. An impeller speed was adjusted at 400 rpm. The first precursor solution, the ammonia solution, and the sodium hydroxide solution, which are prepared, was input continuously into the reactor in an amount of 27 L.

Next, as a third operation, a concentration gradient layer forming solution was prepared with concentration of 2.5 M where nickel sulfate, cobalt sulfate, and manganese sulfate were mixed in a mole ratio of 65:15:20. After fixing an amount of the first precursor solution of 2.5-M concentration, which was mixedly manufactured with nickel sulfate, cobalt sulfate, and manganese sulfate in a mole ratio of 9:1:0 through the second operation in an agitator in addition to the batch reactor, in 10 L, the concentration gradient layer forming solution was input in a rate 2.2 L/hour and agitated with the first precursor solution to make a second precursor solution. At the same time, the second precursor solution was introduced into the batch reactor. Until a mole ratio of nickel sulfate, cobalt sulfate, and manganese sulfate of the second precursor solution reaches concentration of a shell layer that is 4:2:4, the concentration gradient layer forming solution was mixedly introduced into the batch reactor, an ammonia solution having concentration of 28% was input in a rate of 0.08 L/hour, and a sodium hydroxide solution was maintained in pH of 11. In this case, an input amount of the second precursor solution, the ammonia solution, and the sodium hydroxide solution was 17 L.

Next, as a fourth operation, a third precursor solution, which was mixed with nickel sulfate, cobalt sulfate, and manganese sulfate in a mole ratio of 4:2:4, was input into the batch reactor until the volume thereof reaches 5 L. After completing a reaction, a spherical nickel-manganese-cobalt composite hydroxide precipitate was obtained from the batch reactor.

After filtering the precipitated composite metal hydroxide and washing the composite metal hydroxide by water, the washed composite metal hydroxide was dried in a hot blower at 110° C. for 12 hours to obtain a precursor powder having a structure of metal oxide composite where an inner core layer had a continuous concentration gradient to $(Ni_{0.9}Co_{0.1})(OH)_2$ and an outer shell layer had a continuous concentration gradient from $(Ni_{0.9}Co_{0.1})(OH)_2$ to $(Ni_{0.4}Co_{0.2}Mn_{0.4})(OH)_2$.

After mixing the metal hydroxide composite and hydroxide lithium (LiOH) in a mole ratio of 1:1.02, heating the mixture in a temperature elevation rate of 2° C./min, and firing the mixture at 790° C. for 20 hours, there was obtained a positive active material powder where an inner core layer had a continuous concentration gradient to $Li(Ni_{0.9}Co_{0.1})O_2$ and an outer shell layer had a continuous concentration gradient from $Li(Ni_{0.9}Co_{0.1})O_2$ to $Li(Ni_{0.4}Co_{0.2}Mn_{0.4})O_2$.

After dry and wet coating of positive active material particles with an Al compound, the particles were processed in thermal treatment at 720° C.

<Embodiment> Synthesizing NCA Particles

A $NiCo(OH)_2$ precursor was first manufactured through a coprecipitation reaction to obtain an NCA-series positive active material. After mixing the metal hydroxide composite and the lithium hydroxide in a mole ratio of 1:1.02, heating the mixture in a temperature elevation rate of 2° C./min, and firing the mixture at 750° C. for 20 hours, a positive active material powder was obtained.

After dry and wet coating of positive active material particles with an Al compound, the particles were processed in thermal treatment at 720° C.

TABLE 1

| No | Washing time [min] | 1st introduction | | 2nd introduction | | | Calcination temp. [° C.] | Thermal treatment temp. [° C.] |
|---|---|---|---|---|---|---|---|---|
| | | $Al(OH)_3$ | $Al_2O_3$ | $Al(OH)_3$ | $Al_2O_3$ | $Al(NO_3)_3$ | | |
| Comparison-1 | 0 | — | — | — | — | — | 790 | — |
| Comparison-2 | 0 | — | — | — | — | — | 830 | — |
| Comparison-3 | 30 | — | — | — | — | — | 810 | 720 |
| Comparison-4 | 0 | 4.0 | — | — | — | — | 750 | — |
| Comparison-5 | 30 | 3.5 | — | — | — | — | 750 | 720 |
| Comparison-6 | 0 | 4.0 | — | — | — | — | 750 | — |
| Embodiment-1 | 0 | — | — | — | 2.0 | — | 790 | 720 |
| Embodiment-2 | 0 | — | — | — | 2.0 | — | 810 | 720 |
| Embodiment-3 | 0 | — | — | — | 2.0 | — | 840 | 720 |
| Embodiment-4 | 0 | — | — | 1.0 | — | — | 830 | 500 |
| Embodiment-5 | 30 | — | — | — | 1.0 | — | 810 | 720 |
| Embodiment-6 | 120 | — | — | — | — | 1.0 | 810 | 720 |
| Embodiment-7 | 0 | — | — | 2.0 | — | — | 750 | 720 |
| Embodiment-8 | 30 | 2.5 | — | 1.0 | — | — | 750 | 720 |
| Embodiment-9 | 120 | 1.5 | — | — | — | 2.0 | 750 | 720 |

TABLE 1-continued

| No | Washing time [min] | 1st introduction | | 2nd introduction | | | Calcination temp. [° C.] | Thermal treatment temp. [° C.] |
| --- | --- | --- | --- | --- | --- | --- | --- | --- |
| | | Al(OH)$_3$ | Al$_2$O$_3$ | Al(OH)$_3$ | Al$_2$O$_3$ | Al(NO$_3$)$_3$ | | |
| Embodiment-10 | 0 | — | — | 4.0 | — | — | 750 | 720 |
| Embodiment-11 | 120 | 1.4 | — | 1.0 | — | — | 750 | 700 |
| Embodiment-12 | 120 | 3.0 | — | — | — | 2.0 | 750 | 700 |

<Experimental Example> Measuring XRD Characteristics

FIG. 1 shows results of measuring XRD of active materials which are manufactured through Comparison-6 and Embodiment-2.

Different from Comparison-6, particles manufactured through Embodiment-2 according to the inventive concept has a peak between 45° and 46°.

<Experimental Example> Measuring Particle Strength

Figure 2:
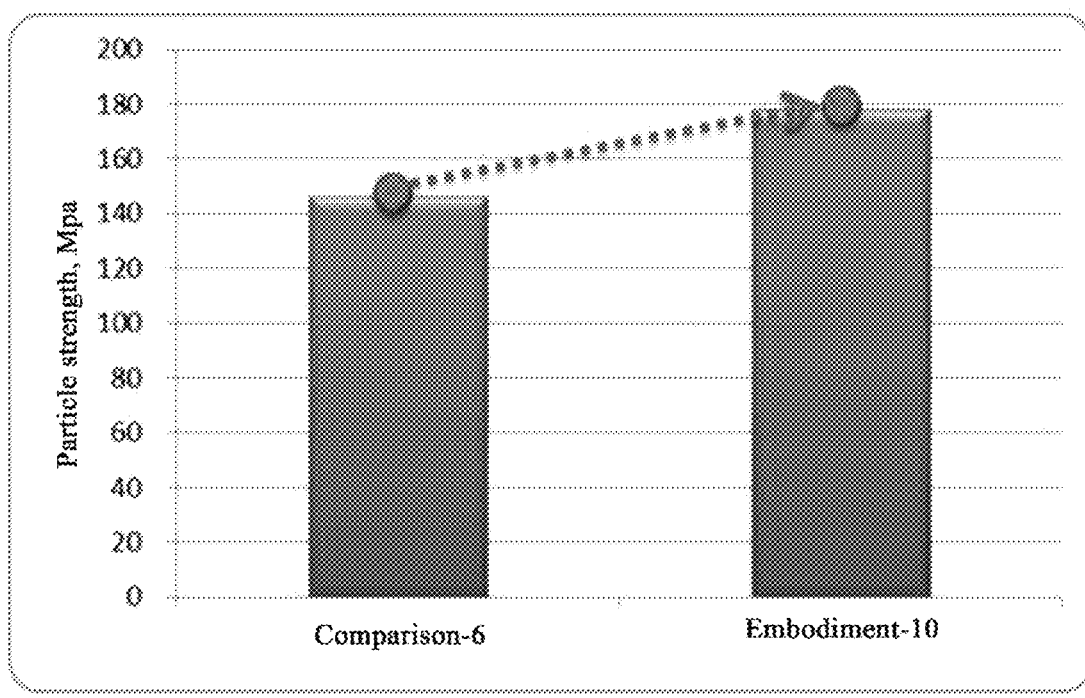
FIG. 2 shows results of measuring particle strength of active materials manufactured through a comparison and an embodiment according to the inventive concept.

FIG. 2 shows results of measuring particle strength of active materials manufactured through Comparison-6 and Embodiment-10.

From FIG. 2, it may be seen that particles manufactured through Embodiment-10 are more improved about 20% than particles of Comparison-6 in strength.

<Experimental Example> Measuring Non-Reacted Lithium

Non-reacted lithium was measured as an amount of 0.1 M HCl which had been used until pH 4 by pH titration. First, after inputting a positive active material of 5 g into distilled water (DIW) of 100 ml, agitating the mixed solution for 15 minutes, filtering the agitated solution, and taking the filtered solution of 50 ml, 0.1 M HCl was added thereto and a consumption amount of HCl dependent on pH variation was measured to determine Q1 and Q2. Then, amounts of non-reacted LiOH and Li$_2$CO$_3$ were calculated by equations as follows.

$M1=23.94$ (LiOH molecular weight)

$M2=73.89$ (Li$_2$CO$_3$ molecular weight)

$SPL$ size=(Sample weight×Solution weight)/Water weight

LiOH (wt %)=[($Q1-Q2$)×$C$×$M1$×100]/($SPL$ size×1000)

Li$_2$CO$_3$ (wt. %)=[2×$Q2$×$C$×$M2$/2×100]/($SPL$ size×1000)

Figure 3:
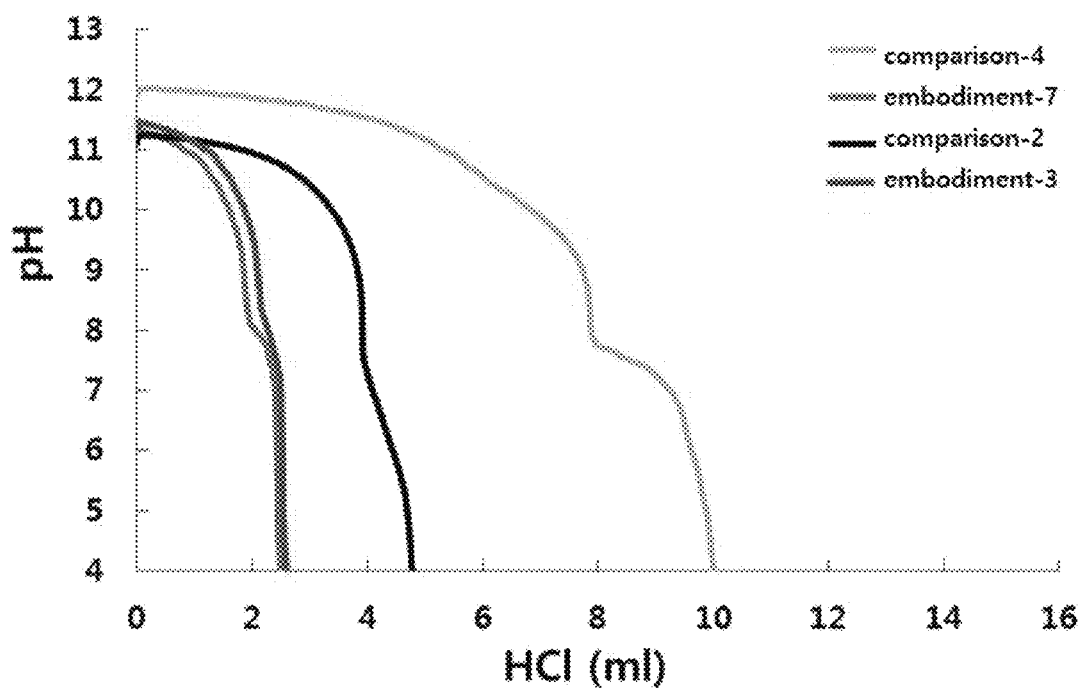
FIG. 3 shows result of measuring amounts of residual lithium components of active materials manufactured through comparisons and embodiments according to the inventive concept.

Table 2 and FIG. 3 show results of measuring concentration of non-reacted LiOH and Li$_2$CO$_3$ from NCA-series lithium oxide composites manufactured through the aforementioned Embodiments and Comparisons, as follows.

TABLE 2

| No | Residual lithium [ppm] | | | Discharge capacity [0.1 C] | Lifetime 100th [%] | Before storage ohm | After storage ohm |
| --- | --- | --- | --- | --- | --- | --- | --- |
| | LiOH | Li$_2$CO$_3$ | Total Li [%] | | | | |
| Comparison-1 | 7,376 | 4,552 | 0.0431 | 206 | 92 | — | — |
| Comparison-2 | 3,211 | 4,128 | 0.0246 | 204 | 92 | 18 | 131 |
| Comparison-3 | 3,445 | 1,220 | 0.0177 | 206 | 84 | — | — |
| Comparison-4 | 5,035 | 3,076 | 0.0293 | 201 | 82 | 5 | 11 |
| Comparison-5 | 2,727 | 1,433 | 0.0153 | 202 | 70 | 7 | 16 |
| Comparison-6 | 7,422 | 3,862 | 0.0414 | 210 | 74 | — | — |
| Embodiment-1 | 4,930 | 4,735 | 0.0334 | 196 | 93 | — | — |
| Embodiment-2 | 3,035 | 1,831 | 0.0176 | 188 | 98 | — | — |
| Embodiment-3 | 1,903 | 869 | 0.0103 | 191 | 83 | 20 | 90 |
| Embodiment-4 | 2,632 | 2,756 | 0.0184 | 205 | 80 | — | — |
| Embodiment-5 | 2,254 | 1,082 | 0.0123 | 204 | 90 | — | — |
| Embodiment-6 | 1,690 | 1,069 | 0.0100 | 203 | 88 | — | — |
| Embodiment-7 | 2,090 | 1,080 | 0.0117 | 206 | 77 | 8 | 20 |
| Embodiment-8 | 2,272 | 1,268 | 0.0129 | 202 | 77 | 6 | 13 |
| Embodiment-9 | 2,116 | 1,239 | 0.0122 | 203 | 77 | 11 | 35 |
| Embodiment-10 | 2,049 | 1,702 | 0.0132 | 204 | 60 | — | — |
| Embodiment-11 | 2,096 | 1,349 | 0.0124 | 209 | 55 | 8 | 13 |
| Embodiment-12 | 2,314 | 1,650 | 0.0141 | 204 | 75 | 33 | 92 |

As shown in FIG. 3, residual lithium of Comparison-4 was measured in a high level because a washing or surface processing was not performed. Residual lithium of Embodiment-7 executing thermal treatment after coating an aluminum compound was reduced than that of Comparison-4 in amount.

Additionally, as shown in FIG. 3, Embodiment-3 executing thermal treatment after coating an aluminum compound with a concentration gradient NCM positive active material was more improved than Comparison-2, which did not execute post-treatment, for residual lithium.

<Experimental Example> Evaluating Charge/Discharge Characteristics

Figure 4:
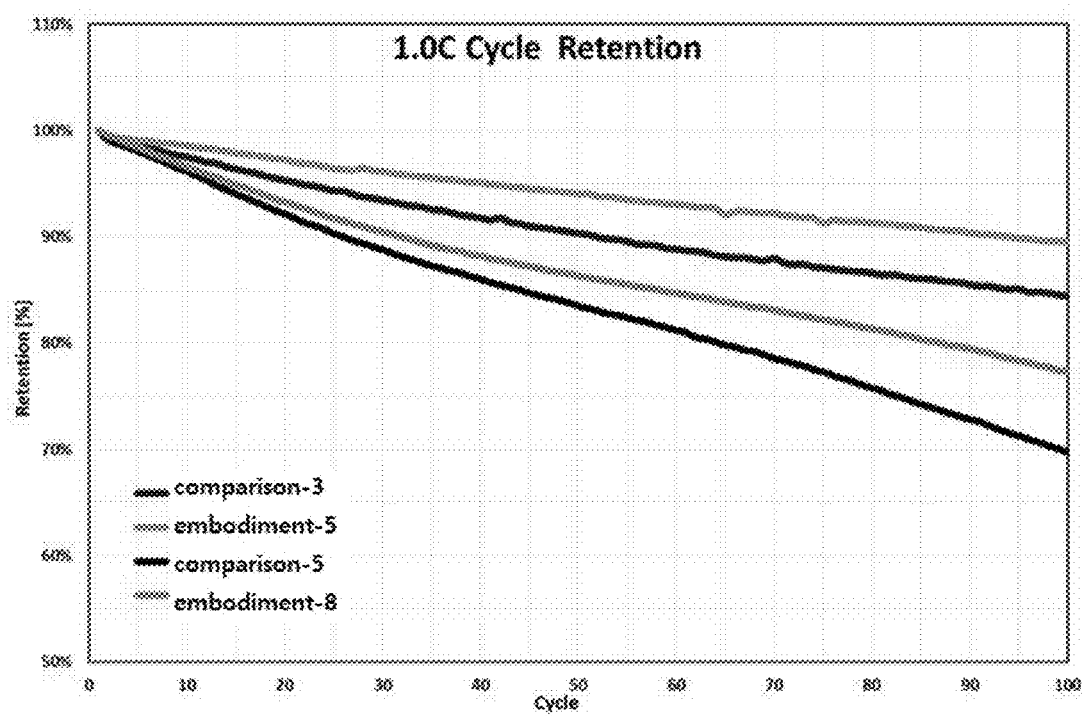
FIG. 4 shows results of measuring lifetime characteristics of batteries including active materials manufactured through comparisons and embodiments according to the inventive concept.

Table 2 and FIG. 4 show results of performing charge/discharge experiments between 3 V and 4.3 V in rates of C/10 charge and C/10 discharge after manufacturing respective coin cells by using positive active materials, which are manufactured through the aforementioned Embodiments and Comparisons, as positive electrodes and by using lithium metals as negative electrodes.

From FIG. 4, it may be seen that an embodiment executing an Al coating after washing is better in lifetime. In FIG. 4, Comparison-3 and Comparison-5 correspond to concentration gradient NCM and NCA positive active materials which are respectively washed. Embodiment-5 for a concentration gradient NCM positive active material made executing an Al coating after washing and Embodiment-8 for a concentration gradient NCA positive active material executing an Al coating after washing were improved in lifetimes.

Figure 5:
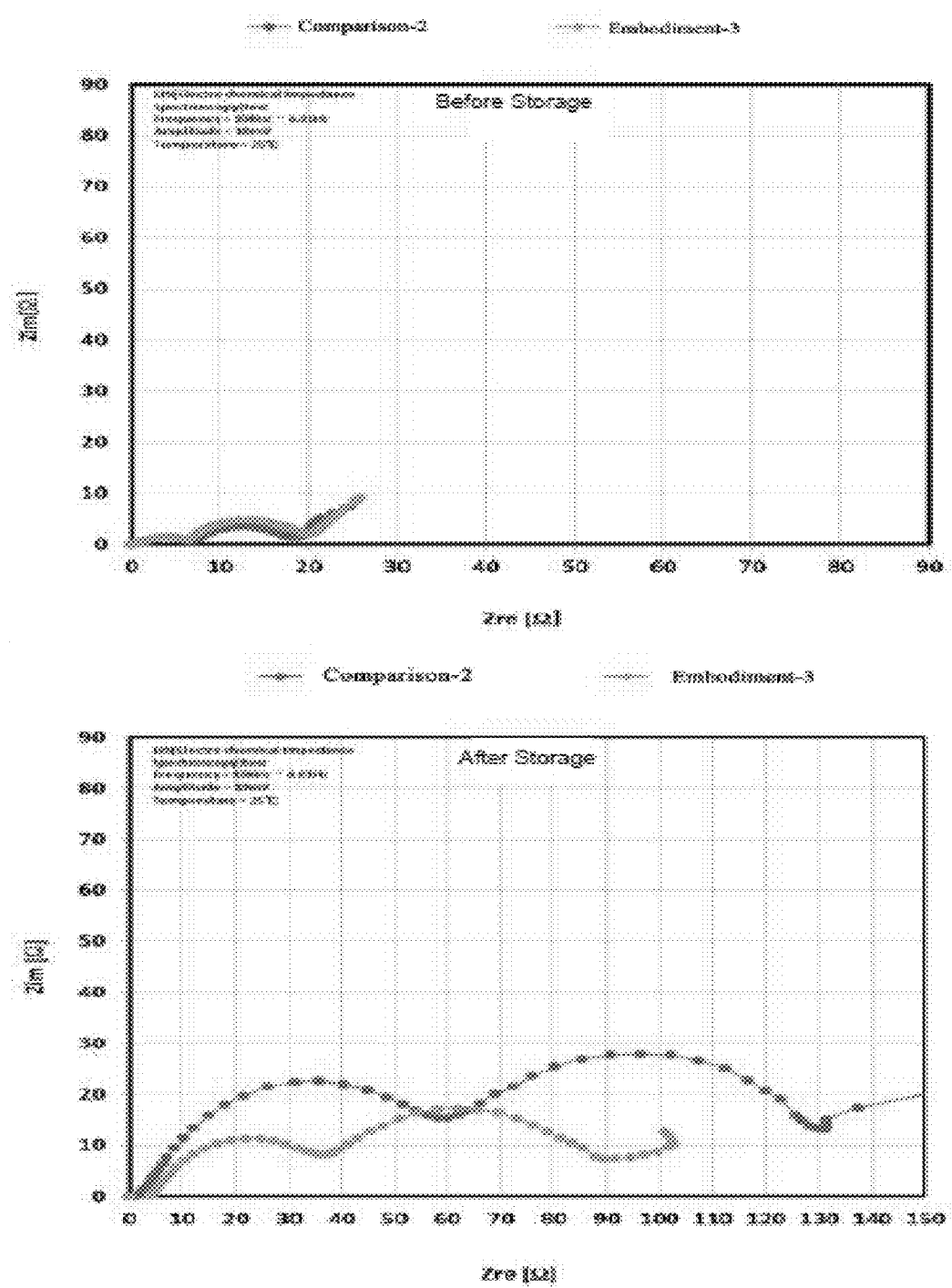
FIG. 5 shows results of high temperature storage characteristics of active materials manufactured through comparisons and embodiments according to the inventive concept.

<Experimental Example> Results of Measuring Impedance Before/After High Temperature Storage Table 2 and FIG. 5 show results of measuring impedance before/after high temperature storage of Embodiment 3 for an NCM-series positive active material having a continuous concentration gradient.

From FIG. 5, it may be seen that impedance of Embodiment-3 executing thermal treatment after an Al coating is more reduced than that of Comparison-2 which does not execute washing and surface treatment.

Embodiments of the inventive concept relate to a positive active material including $LiAlO_2$ and a method for producing the same, being highly useful for enhancing particle strength, as well as reducing residual lithium, due to presence of $LiAlO_2$ by doping the positive active material with aluminum and then reacting the residual lithium, which is existing in the surface, with the aluminum.

The invention claimed is:

1. A method for producing a positive active material comprising $LiAlO_2$ in a surface and being given in Formula 1 that is $Li_{1+a}Ni_bM1_cM2_dO_2$, comprising:
preparing the positive active material;
preparing a washing solution in uniform temperature;
agitating the positive active material in the washing solution;
drying the washed positive active material; and
mixedly agitating the positive active material with a compound including Al,
where $0.95 \geq b \geq 0.75$, $a+b+c=1$, M1 is one or more selected from a group of Co, B, Ba, Cr, F, Li, Mo, P, Sr, Ti, and Zr, and
M2 is one or more selected from a group of Mn, Al, B, Ba, Cr, F, Li, Mo, P, Sr, Ti, and Zr.

2. The method of claim 1, wherein the compound including the Al is selected from a group of $Al(OH)_3$, $Al_2O_3$, $Al(NO_3)_3$, $Al_2(SO_4)_3$, $AlCl_3$, $AlH_3$, $AlF_3$, and $AlPO_4$.

3. The method of claim 1, wherein the washing solution is distilled water or an alkaline solution.

4. The method of claim 1, wherein the drying includes:
vacuum-drying the washed positive active material at 80 to 200° C. for 5 to 20 hours.

* * * * *